(12) United States Patent
Yehia et al.

(10) Patent No.: US 6,675,145 B1
(45) Date of Patent: Jan. 6, 2004

(54) METHOD AND SYSTEM FOR INTEGRATED AUDIOVISUAL SPEECH CODING AT LOW BITRATE

(75) Inventors: Hani Yehia, Kyoto (JP); Takaaki Kuratate, Kyoto (JP); Eric Vatikiotis-Bateson, Kyoto (JP)

(73) Assignee: Advanced Telecommunications Research Institute International, Kyoto (JP)

( * ) Notice: Subject to any disclaimer, the term of this patent is extended or adjusted under 35 U.S.C. 154(b) by 0 days.

(21) Appl. No.: 09/531,425

(22) Filed: Mar. 20, 2000

(30) Foreign Application Priority Data

Oct. 26, 1999 (JP) .......................................... 11-304295

(51) Int. Cl.[7] .......................... G10L 21/00; G10L 19/00
(52) U.S. Cl. ....................................... 704/270; 704/201
(58) Field of Search ................................ 704/260, 258, 704/259, 270, 200, 201; 345/473; 348/14.01, 14.13; 382/100, 118, 156–159, 232, 276

(56) References Cited

U.S. PATENT DOCUMENTS 5,657,426 A * 8/1997 Waters et al. ............... 704/270
5,802,220 A * 9/1998 Black et al. ................. 382/100
5,805,745 A * 9/1998 Graf .......................... 348/14.07

FOREIGN PATENT DOCUMENTS

JP            11-219422            8/1999

OTHER PUBLICATIONS

"Emotion Estimation from Speech and Real–Time Media Conversion System" Imamura, et al., Proceedings of 1999 IEICE General Conference, ESS Society, Japan, Institute of Electronics, Information and Communication Engineers, Mar. 8, 1999, A–14–4, p. 305 (with description of relevance of reference).

* cited by examiner

Primary Examiner—Richemond Dorvil
Assistant Examiner—Angela Armstrong
(74) Attorney, Agent, or Firm—McDermott, Will & Emery

(57) ABSTRACT

A method to transmit face images including the steps of: preparing a facial shape estimation unit receiving speech produced by a speaker and outputting a signal estimation the speaker's facial shape when he/she speaks; transmitting the speech produced by the speaker from the transmitting side to the receiving side and applying it to the facial shape estimation unit so as to estimate the speaker's facial shape; and generating a motion picture of the speaker's facial shape based on the signal estimation the speaker's facial shape output by the facial shape estimation unit.

25 Claims, 7 Drawing Sheets

METHOD AND SYSTEM FOR INTEGRATED AUDIOVISUAL SPEECH CODING AT LOW BITRATE

BACKGROUND OF THE INVENTION

The present invention is related to the article "Using Speech Acoustics to Drive Facial Motion", by Hani Yehia, Takaaki Kuratate and Eric Vatikiotis-Bateson (Proceedings of the 14th International Congress of Phonetic Sciences, Vol.1, pp.631–634, American Institute of Physics, August 1999), which follows attached.

1. Field of the Invention

The present invention is an electronic communication technique. More specifically, it consists of a method and system used for digital encoding-decoding of audiovisual speech, i.e. facial image and sound produced by a speaker. The signal is encoded at low bit-rates. The speech acoustics is represented in a parametric form where as facial image estimated from speech acoustic parameters by means of a statistical model.

2. Description of the Background Art

Developments in wide area computer networks and edigital communication techniques have contributed to the practical use of video conference systems. These systems enable persons at remote locations to have a conference through a network. Also, telephone communication can be expanded to incorporate video information by means of digital cameras (CCD) currently available. Such systems, however, require bit-rates sufficiently low so that the users' demand is compatible with channel capacity.

Using conventional techniques, transmission of image signals require a bit-rate between two and three orders of magnitude larger than that required for the transmission of telephone speech acoustics. Thus, if video is to be transmitted over a telephone line, the frame rate has to be very low.

One way to solve this problem is to increase the bit-rate capacity of the channel Such a solution is, however, expensive and, hence, not practical. Moreover, the increasing demand for real time video communications justify efforts in the direction innovative video compression techniques.

Video compression rate is limited if done without taking into account the contents of the image sequence that forms the video signal. In the case of audiovisual speech coding, however, it is know that the image being encoded is that of a human face. The use of this information allows the development of compression techniques which are much more efficient. Furthermore, during speech, the acoustic signal is directly related to the speaker's facial motion. Thus, if the redundancy between audio and video signals is reduced, larger compression rates can be achieved. The technique described in this text goes in this direction.

SUMMARY OF THE INVENTION

The objective of the present invention is to provide a method and system of audiovisual speech coding, which is capable of transmitting and recovering a speaker's facial motion and speech audio with high quality even through a channel of limited capacity.

This objective is achieved in two steps. First, facial images are encoded based on the a priori information that the image being encoded is that of a human face. Second, the dependence between speech acoustics and facial motion is used to allow facial image recovery from the speech audio signal.

In the present invention, the method of transmitting facial image includes the following steps: (1) setup, at the receiver, of a facial shape estimator which receives the speech audio signal as input and generates a facial image of the speaker as output; (2) transmission of the speech audio signal to the receiver, and (3) generation of the facial images which form the speaker's video signal.

Thus, transmission of only the speech audio signal enables the receiver to generate the speaker's facial video. The facial image can then be transmitted with high efficiency, using a channel of far lower bit-rate, as compared with the transmission bit-rate required for standard image coding.

Preferably, the setup step is divided in the following parts: (1.a) specification of an artificial neural network architecture to be used at both transmitter and receiver sides; (1.b) training of the artificial neural network on the transmitting side so that facial images determined from the speech audio signal match original facial images as well as possible; and (1.c) transmission of the weights of the trained artificial neural network to the receiver.

The artificial neural network of the transmitter side is trained and its parameters are sent to the receiver side before communication starts. So, the artificial neural network of the receiving side is set identically to that of the transmitter side when communication is established. Thus it is ready for audiovisual speech communication using only the speech audio to recover the speech video counterpart.

Preferably, the step of neural network training consists of measuring coordinates of predetermined portions of a speaker's face during speech production on the transmitting side; simultaneous extraction of parameters from the speech audio signal; and adjusting the weights of the artificial neural network using the speech audio parameters as input and the facial measured coordinates as reference signal.

The artificial neural network is trained for each speaker. Therefore, efficient real time transmission of facial images of an arbitrary speaker is possible.

Preferably, the method of face image transmission also includes the following steps: measuring, for each frame, coordinates of predetermined portions of the speaker's face during speech production; applying the speech audio signal to the trained artificial neural network of the transmitting side to obtain estimated values of the coordinates of the predetermined portions of the speaker's; and comparing measured and estimated coordinate values to find the estimation error.

As the error between the estimated coordinate values of the predetermined positions of the speaker's face estimated by the artificial neural network and the actual coordinates of the predetermined positions of the speaker's face on the transmitting side is found, it becomes possible to determine to which extent the face image of the speaker generated on the receiving side through communication matches the speech.

Preferably, the method of face image transmission further includes the following steps: transmitting the estimation error to the receiving side; and correcting the output of the artificial neural network on the receiving side based on the estimation error received. The precision used to transmit the estimation error is, however, limited by the channel capacity (bit-rate) available.

As the error signal obtained on the transmitting side is transmitted to the receiving side, it becomes possible to correct the image obtained on the receiving side by using the error signal. As a result, a video signal of the speaker's face matching the speech signal can be generated.

Preferably, the method of face image transmission further includes the following steps: comparing magnitude of the estimation error with a predetermined threshold value; when the magnitude of the error exceeds the threshold value, transmitting the error to the receiving side in response; and correcting the output of the artificial neural network on the receiving side based on the received error.

As the error signal obtained on the transmitting side is transmitted to the receiving side when the magnitude of the error signal obtained on the transmitting side exceeds the predetermined threshold value, it becomes possible to correct the image obtained on the receiving side by using the error signal. As a result, the video signal of the speaker's face matching the speech signal can be obtained. The error signal is not always transmitted, and the bit-rate used to transmit it is chosen so that transmission of the speech signal is not hindered.

According to another aspect of the present invention, the system for transmitting the audio signal and the video signal of the face of a speaker during speech production on the transmitting side to the receiving side includes: a transmission apparatus for transmitting the speech audio signal produced by the speaker to the receiving side; a facial shape estimation unit receiving the speech audio signal produced by the speaker transmitted from the transmitting apparatus and outputting an estimated facial shape of the speaker; and a receiving apparatus including a face image generation unit which generates facial images of the speaker. These images are based on the facial shapes estimated from the speech audio signal by the facial shape estimation unit.

It is possible for the receiving side to generate the video signal of the facial shape of the speaker on the transmitting side by simple transmission of only the speech audio signal from the transmitting side to the receiving side.

Thus, transmission of only the speech audio signal enables the receiver to generate the speaker's facial video. The facial image can then be transmitted with high efficiency, using a channel of far lower capacity, as compared with the transmission bit-rate required for standard image coding.

Preferably, the transmitting apparatus further includes a circuit which compares an estimation error with a predetermined threshold value and transmits the error to the receiving side when it exceeds the threshold value. Preferably, the receiving apparatus further includes an error correction circuit which corrects the outputs of the receiving side artificial neural network based on the received error.

As the estimation error signal obtained on the transmitting side is transmitted to the receiving side when its magnitude exceeds the predetermined threshold value, it becomes possible to correct the image obtained on the receiving side by using the estimation error signal. As a result, a video signal of the speaker's face matching the speech signal can be obtained. The error signal is not always transmitted, and the bit-rate used to transmit it is chosen so that transmission of the speech signal is not hindered.

According to a further aspect of the present invention, the apparatus for transmitting face image used in the system for transmitting the audio and video signals of the face of a speaker during speech production on the transmitting side to the receiving side includes: a circuit for transmitting the speech audio signal to the receiving apparatus; an artificial neural network capable of learning, using parameters extracted from the speech produced by the speaker as input, and giving information from which the face image of the speaker can be specified as output; and a circuit for transmission of feature parameters of the artificial neural network to the receiving side.

As the artificial neural network on the transmitting side is trained before communication and the feature parameters of the trained artificial neural network are transmitted to the receiving side, the artificial neural network on the receiving side can be set identically to the artificial neural network on the transmitting side. Therefore, it is possible for the receiving apparatus to estimate the speaker's facial shape and to generate motion pictures of the face using the artificial neural network from the speech audio signal received. Thus real time transmission of motion pictures of the face is possible with a small amount of data per frame.

Preferably, the apparatus for facial image transmission includes: a measuring circuit for time sequentially measuring coordinates of predetermined portions of the speaker's face; a feature extracting circuit for time sequentially extracting feature parameters of the speech produced by the speaker; and a circuit for training of an artificial neural network, which uses the speech audio features obtained by the feature extracting circuit as input, and the coordinates measured by the measuring circuit as the teacher signal. These data are obtained simultaneously while when the speaker reads training sentences.

As the artificial neural network is trained for each speaker during the production of training sentences, highly efficient real time transmission of the face image of any speaker is possible.

According to another aspect of the present invention, the apparatus for recovering the face image includes: a facial shape estimation unit receiving feature parameters extracted from the speech acoustics produced by the speaker and outputting an estimated signal of the speaker's facial shape; and a face image generation circuit which generates a video signal of the speaker's facial shape. The sequence images that form the video signal is based on the facial shapes estimated from the speech audio signal by the facial shape estimation unit.

It is possible for the face image recovering apparatus to generate the video signal of the speaker's face directly from speech audio signal produced by the speaker and transmitted to the receiving side. Thus, the facial image can be recovered with high efficiency, using a channel of far lower capacity (bit-rate), as compared with the transmission bit-rate and storage required for standard image coding. According to a still further aspect of the present invention, the apparatus for transmitting face image used in the system for transmitting the audio and video signals of the face of a speaker during speech production on the transmitting side to the receiving side includes: a speech audio signal transmission circuit transmitting the speaker's speech to the receiving apparatus; a trainable artificial neural network which uses feature parameters of the speech produced by the speaker as input, and yields as output information for which the speaker's face image can be specified; and a parameter transmission circuit which transmits the feature parameters (weights) of the artificial neural network to the receiving side.

According to a still further aspect of the present invention, the apparatus for recovering face image includes: a facial shape estimation circuit which receives feature parameters extracted from the speech produced by the speaker and outputs an estimated facial shape of the speaker while he/she produces speech; and a face image generation circuit which generates a video signal of the speaker's facial shape. This video signal is based on the estimated speaker's facial shape output by the facial shape estimation circuit upon reception of the speech feature parameters.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
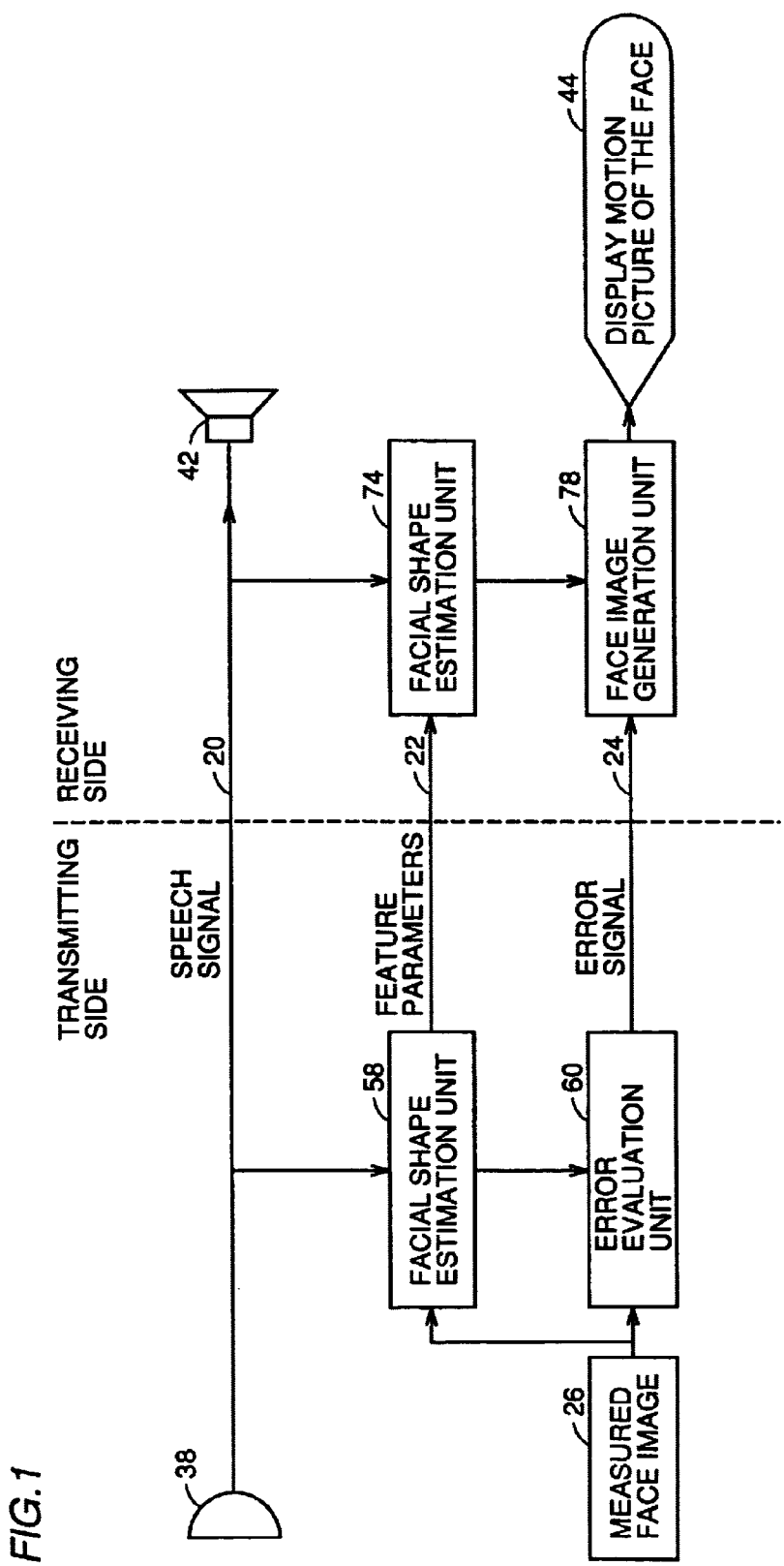
FIG. 1 is a block diagram representing principles of the method and system of transmitting face image in accordance with the embodiment of the present invention.

The equations and expressions used in the following description of the embodiments are listed below. In the description that follows, each equation is referred to by the number allotted to it. It should be noted that some signs ("~" and the like) placed above a variable may be placed before variant in the description below.

$$f_m = [f_{1m}\ f_{2m}\ \ldots\ f_{Pm}] \quad (1)$$

$$F_{tr} = [f_1\ f_2\ \ldots\ f_{M_{tr}}] \quad (2)$$

$$X_m = [x_{1m}\ x_{2m}\ \ldots\ x_{3N_{tr}}]^T \quad (3)$$

$$X_{tr} = [x_1\ x_2\ \ldots\ x_{M_{tr}}] \quad (4)$$

$$C_{xx} = \frac{1}{M_{tr}}[X_{tr} - \mu_x][X_{tr} - \mu_x]^t \quad (5)$$

$$C_{xx} = US_{xx}U^1 \quad (6)$$

$$x \approx U_x p_x + u_x \quad (7)$$

$$p_x = U_x^1(x - \mu_x) \quad (8)$$

$$p_k \approx \tilde{p}_k = w_k^2[\tanh(W_k^1 f + b_k^1) + b_k^2], k = 1, \ldots, K \quad (9)$$

$$W_k^1 = \begin{bmatrix} w_{11k}^1 & \ldots & w_{1Pk}^1 \\ \vdots & & \vdots \\ w_{Q1k}^1 & \ldots & w_{QPk}^1 \end{bmatrix} \quad (10)$$

$$b_k^1 = [b_{1k}^1\ \ldots\ b_{Qk}^1]^T \quad (11)$$

$$W_k^2 = [w_{1k}^2\ \ldots\ w_{Qk}^2]^+ \quad (12)$$

Though the following embodiment is directed to transmission of a face image to a remote terminal using speech, it would be apparent for those skilled in the art that the invention is also applicable to an application for recovering a face image from a stored speech signal for example.

Referring to FIG. 1, the principle of the face image transmitting system, in accordance with the embodiment of the present invention, will be described. As can be seen from FIG. 1, the apparatus on the transmitting side includes: a microphone 38 to converting the speech produced by a speaker into a speech audio signal; a facial shape estimation unit 58 consisting of an artificial neural network receiving as input signal feature parameters extracted from the speech acquired by the microphone 38 and outputting estimate values of the coordinates of predetermined positions of the speaker's face; an error evaluation unit 60 which compares, after the training of the artificial neural network, the values of the coordinates of the predetermined positions of the speaker's face estimated by the facial shape estimation unit 58 from the speech feature parameters with the actually measured coordinate values of the predetermined positions of the speaker's face during speech, and evaluates the estimation error of the values of the coordinates output by the facial shape estimation unit 58. When the magnitude of the error evaluated by the error evaluation unit 60 is larger than a predetermined threshold, the error is transmitted to the receiving side, under the constraints imposed by the channel capacity.

Prior to actual communication, it is necessary to have the artificial neural network, which is the facial shape estimation unit 58, trained such that estimated values of the coordinates of predetermined positions of a speaker's face can be output based on the speech produced by the speaker. As a result of the training, feature parameters such as the weights of each node of the artificial neural network are determined. The feature parameters are transmitted only once to the receiving side, prior to the actual communication.

The apparatus on the receiving side includes a facial shape estimation unit 74 which contains an artificial neural network having the same configuration as the artificial neural network of the facial shape estimation unit 58, which is adjusted in accordance with the feature parameters 22 transmitted from the facial shape estimation unit 58. Once adjusted, the facial shape estimation unit 74 is ready to output estimated values of the coordinates of the predetermined positions of the speaker's face, upon reception of the speech signal from the transmitting side.

The apparatus of the receiving side further includes an image generation unit 78 for generating and displaying on a monitor 44 motion pictures of the speaker's face, based on the estimated values of the coordinates of the predetermined positions of the speaker's face output from the facial shape estimation unit 74. The speech transmitted from the transmitting side is reproduced by a loudspeaker 42 on the receiving side and, simultaneously, the face image of the speaker, whose facial expression changes controlled by speech feature parameters, is displayed on the monitor 44.

When the error signal 24 transmitted from the error evaluation unit 60 is added by the face image generation unit 78 to the output of the facial shape estimation unit 74, the motion pictures of the speaker's face can be recovered with higher fidelity.

Figure 2:
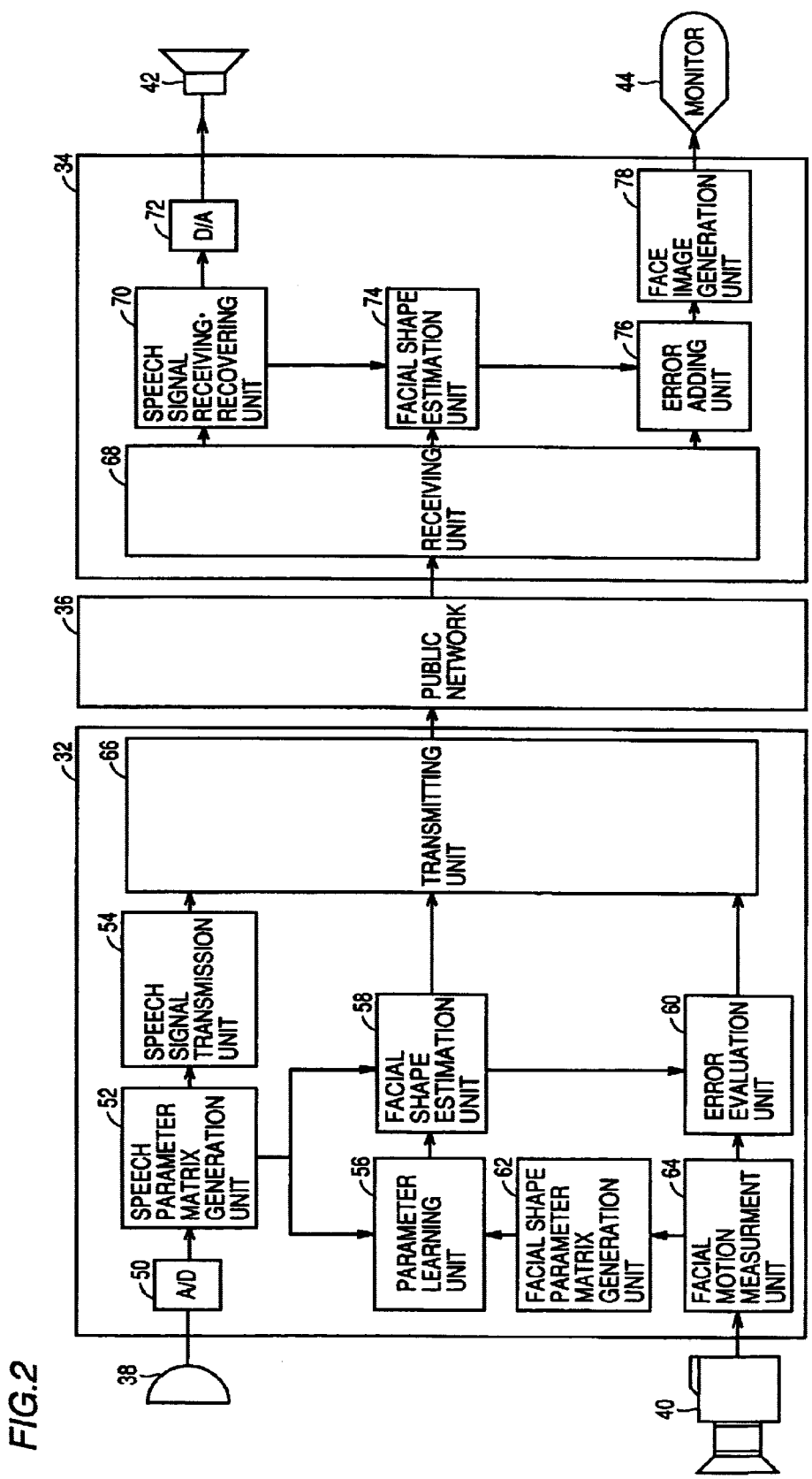
FIG. 2 is a detailed block diagram of the system for transmitting face image shown in FIG. 1.

Referring to FIG. 2, the system will be described in greater detail. The system includes a face image transmitting apparatus 32 and a face image receiving apparatus 34 connected to each other through a public network 36. A system in accordance with the following embodiment is configured such that the face image transmitting apparatus 32 transmits the speech audio signal, and the face image receiving apparatus 34 generates and displays the face image of the speaker based on the speech audio signal received. Needless to say, bidirectional speech (and face image) communication is possible when the same configuration as that of the face image transmitting apparatus 32 is provided on the side of the face image receiving apparatus 34 and the same configuration as that of the face image receiving apparatus 34 is provided on the side of the face image transmitting apparatus 32.

The face image transmitting apparatus 32 includes: an A/D converting unit 50 receiving the analog speech electric audio signal from a microphone 38 for converting the speaker's speech to the speech electric signal and converting the signal to a digital signal by sampling and quantization; a matrix generation unit 52 for extracting time sequential feature parameters of the speech from the speech signal digitized by the A/D converting unit 50 and converting the signal to data in matrix from; a speech signal transmitting unit 54 for performing processing such as compression on the digitized speech signal from which feature parameters have been extracted by the matrix generation unit 52 and transmitting the result to the face image receiving apparatus 34; a facial motion measuring unit 64 for measuring and outputting coordinates of specific positions of the face from the face image of the speaker picked up by a video camera 40; a matrix generation unit 62 for providing, in a matrix form, the coordinate data of the specific positions of the face output from the facial motion measuring unit 64; a facial shape estimation unit 58 including an artificial neural network receiving as input the output of the matrix generation unit 52; a parameter training unit 56 receiving outputs from the matrix generation units 52 and 62, performing the training process of the facial shape estimation unit 58 by the back-propagation method such that the error between the output of the facial shape estimation unit 58 for the output of the matrix generation unit 52 and the coordinate data of the specific positions of the face applied from matrix generation unit 62 is minimized, and transmitting the feature parameters of the artificial neural network of the facial shape estimation unit 58 set as a result of training to the face image receiving apparatus 34; an error evaluation unit 60 for evaluating, after the artificial neural network of facial shape estimation unit 58 is set, the error between the estimated values of the coordinates of predetermined positions of the speaker's face output from the facial shape estimation unit 58 and the measured values of the coordinates of the predetermined positions of the speaker's face measured by the facial motion measuring unit 64, and transmitting, when the magnitude of the error is larger than a predetermined threshold value, the error signal to the face image receiving apparatus 34; and a transmitting unit 66 connected to the speech signal transmitting unit 54, the facial shape estimation unit 58 and the error evaluation unit 60, modulating digital signals output from these units and transmitting the modulated signals to a public network 36 for transmission to the face image receiving device 34.

The face image receiving apparatus 34 includes: a receiving unit 68 demodulating the data received from the public network 36 and outputting the result separately as compressed speech signal 20, feature parameters 22 and error signal 24; a speech signal receiving*recovering unit 70 receiving the speech signal 20 from the receiving unit 68 and performing a process of recovering the compressed speech signal and the like; a D/A converting unit 72 converting the digital speech signal recovered by the speech signal receiving*recovering unit 70 to an analog signal and applying it to a loudspeaker 42; a facial shape estimation unit 74 including an artificial neural network adjusted with the feature parameters received from the face image transmitting apparatus 32 through the receiving unit 68, using the speech signal applied from the speech signal receiving*recovering unit 70 as an input, for outputting estimated values of the coordinates of the specific positions of the speaker's face; an error adding unit 76 adding the error signal received from the error evaluation unit 60 through the receiving unit 68 to the output of the facial shape estimation unit 74 for correcting the estimated values of the coordinates of the predetermined positions of the speaker's face; and a face image generation unit 78 for generating the face image of the speaker and outputting and displaying the same on a monitor 44, based on the estimated values of the coordinates of the predetermined positions of the speaker's face corrected by the error adding unit 76.

Figure 3:
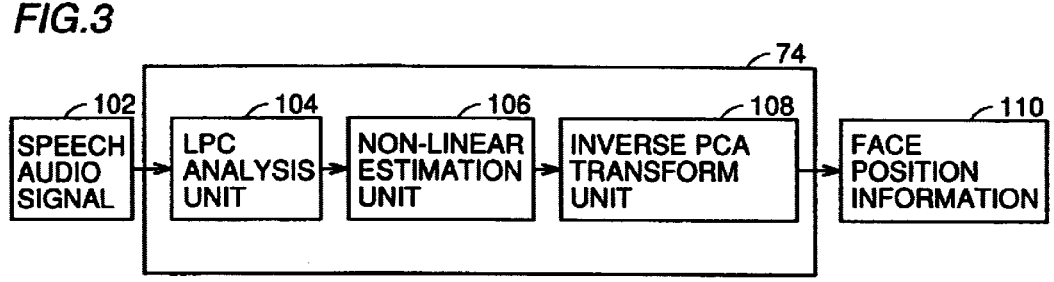
FIG. 3 is a block diagram of the facial shape estimation unit on the receiving apparatus side.

Referring to FIG. 3, the facial shape estimation unit 74 includes: an LPC (linear predictive coding) analyzing unit 104 performing an LPC analysis process on the audio signal 102 output from the speech signal receiving*recovering unit 70 and outputting LSP (line spectrum pair) parameters; a non-linear estimation unit 106 consisting of an artificial neural network using the LSP parameters output from the LPC analyzing unit 104 as an input for outputting a PCA (principal component analysis) representation of the face coordinate vector; and an inverse PCA transform unit 108 performing inverse PCA transform on the PCA representation output from the non-linear estimation unit 106 for outputting face position information 110.

Figure 4:
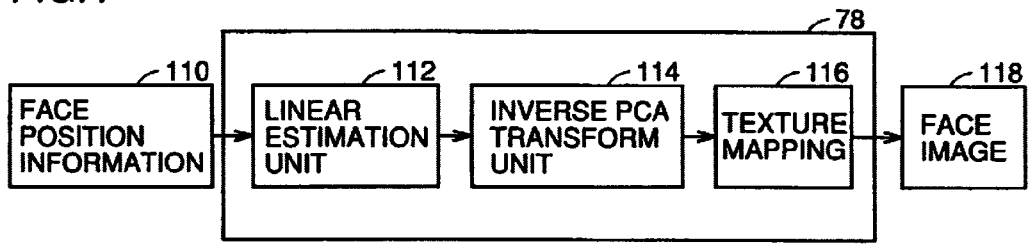
FIG. 4 is a block diagram of a face image generation unit on the receiving apparatus side.

Referring to FIG. 4, the face image generation unit 78 includes: a linear estimation unit 112 performing linear estimation based on the face position information 110 output from the facial shape estimation unit 74 and corrected by the error adding unit 76 for outputting a PCA representation of a mesh of the face image; an inverse PCA transform unit 114 performing inverse PCA processing on the PCA representation of the mesh image of the face output from the linear estimation unit 112 to obtain a mesh of the face; and a texture mapping unit 116 mapping texture of human skin on the surface of the face image formed based on the outputs of the inverse FCA transmitting unit 114 for outputting a face image 118.

Figure 5:
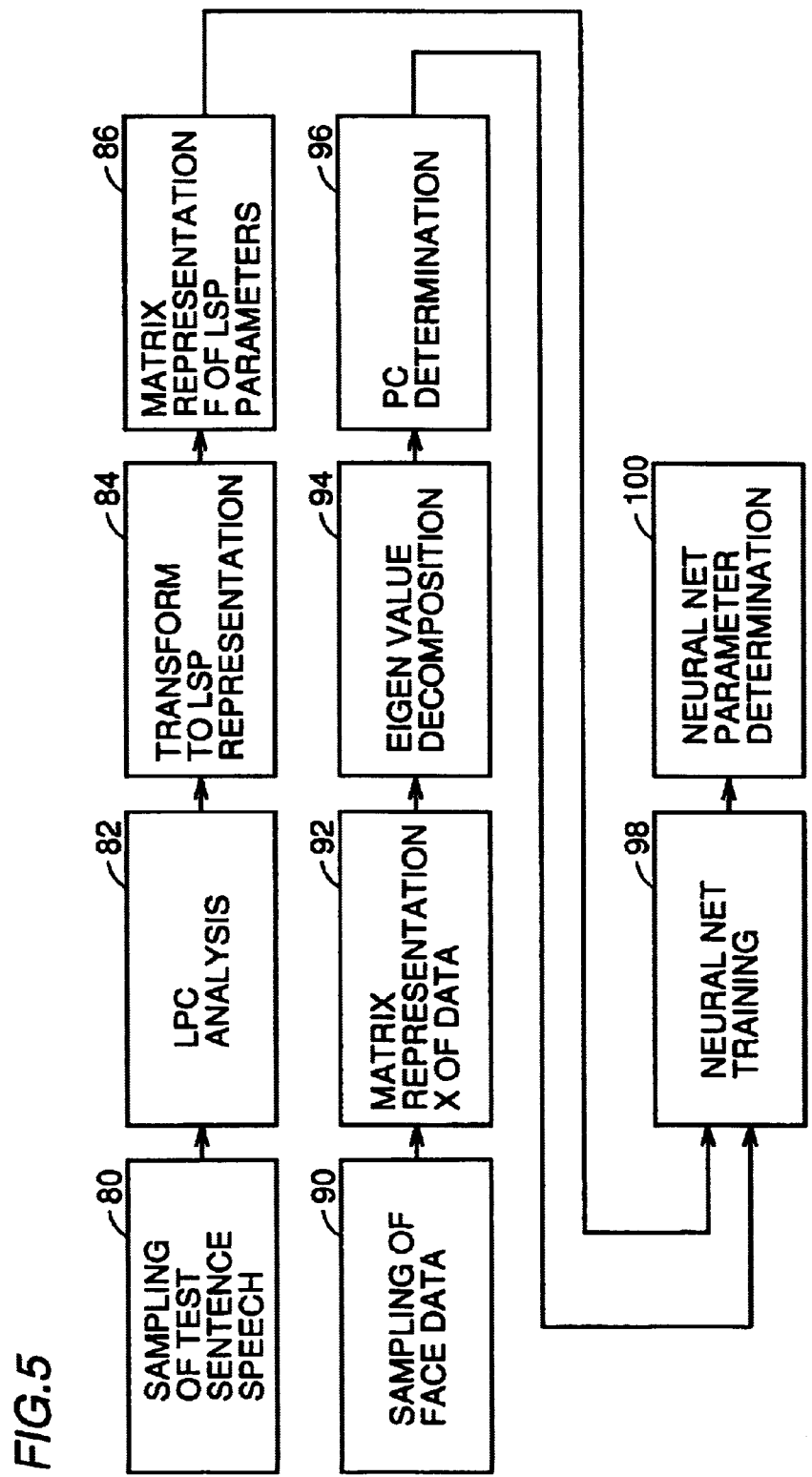
FIG. 5 is a flow chart representing the process flow which takes place in the face image transmitting apparatus.

Referring to FIG. 5, the process flow when the artificial neural network of the facial shape estimation unit 58 is trained in the face image transmitting apparatus 32 will be described. In the system of the present embodiment, before the start of a communication process, the speaker reads training sentences prepared in advance, and the artificial neural network is trained based on the speech signal and the coordinate values of predetermined positions of the speaker's face at the time of reading. Here, the processing of the speech and processing of the face image are performed in parallel. For convenience of description, in the following, the processing on the speech is discussed first, followed by the processing of the face image.

First, the speech of the training sentence is sampled (sampled and quantized) at a predetermined sampling rate (80). The sampled values are divided in blocks using a Hamming window using a frame of a predetermined period as a unit, and each frame is submitted to an LPC analysis (82). The coefficients obtained by LPC analysis are transformed into LSP coefficients (84). The parameters thus transformed into LSP coefficients are arranged in a matrix representation F (86).

Though LSP representation is used here, it is due to the fact that LSP parameters are closely related to the speech format frequencies. These format frequencies are resonance frequencies of the tube defined by the shape of the vocal tract during vowel-like production. In turn, the shape variation of the vocal tract dominates, to a considerable extent, the facial shape variation of one's face.

The process for providing a matrix will be more specifically described. The parameters extracted by LPC analysis (of p-th order) for the m-th frame of the digitized speech signal is represented as a p-dimensional vector f_m in accordance with Equation (1). In Equation (1) and other equations, the superscript letter "t" of a vector or matrix represents the transpose of that vector or matrix.

The vectors f_m (m=1~Mtr) thus obtained for the training sentences (number of frames=Mtr) is arranged in the shape of a matrix to obtain the matrix Ftr of equation (2). The matrix Ftr is the output of step 86. The matrix Ftr is used as an input for the learning process (98) of the artificial neural network.

Figure 6:
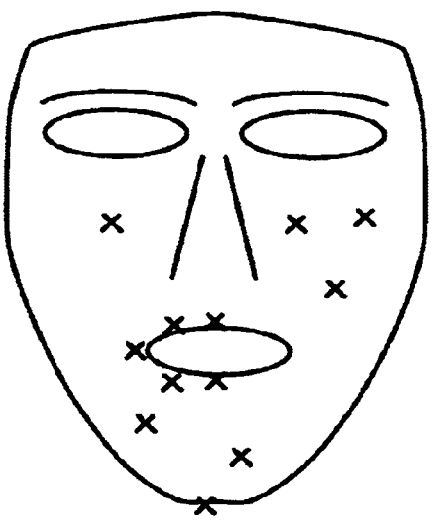
FIG. 6 shows measurement positions of coordinates of the first subject's face.
Figure 7:
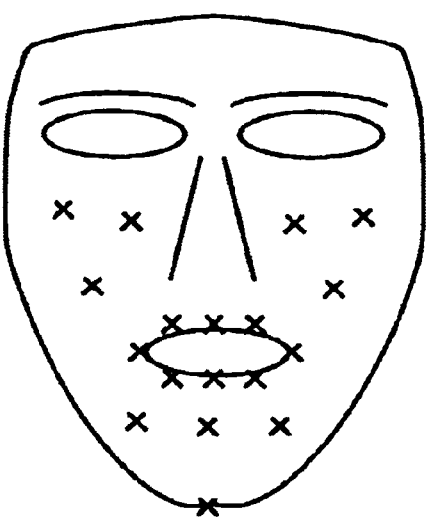
FIG. 7 represents measurement positions of coordinates of the second subject's face.

Meanwhile, parallel to the speech processing described above, the coordinate data of the predetermined positions of the face are measured and sampled from the face image of the speaker reading the training sentence (90). Here, measurement is done by image recognition technique of the face image data. Alternatively, the coordinate data of the position may be measured by fixing a position sensor attached directly on predetermined positions on the speaker's face. Here again, the data are processed frame by frame. FIGS. 6 and 7 show examples of the predetermined positions of the speaker's face as selected. In the example shown in FIG. 6, 12 points around the chin, mouth and cheek of the speaker are selected. In the example of FIG. 7, 18 points are similarly selected.

The vector of coordinate values of the n-th frame (hereinafter referred to as face coordinate vector) x_n of the predetermined positions of the face thus obtained is represented by Equation (3). In Equation (3), N represents the number of predetermined positions of the face as the object of measurement. The vector xn is 3N-dimensional.

The vector of the coordinate position thus obtained can be given by Xtr of equation (4) when represented in the form of a matrix. In equation (4) also, Mtr represents the number of frames contained in the training sentence read.

An eigenvalue decomposition process (94) for principal component analysis (PCA) is performed on the matrix Xtr obtained and its principal components are determined (96). The principal component analysis is a method of reducing, when the pattern after feature extraction is represented by a multi-dimensional feature vector, the number of statistically significant components by reducing redundancy generally present in a multi-dimensional feature vector. In the principal component analysis, a pattern is represented in a low-dimensional subspace where the dispersion of a pattern distribution is large. The principal component analysis is a method used for approximating the original information by a linear combination of a few basis-vectors which are the eigenvectors associated with the largest eigenvalues of the space defined by the multi-dimensional vector distribution under analysis.

The method of determining the principal components is as follows. First, the covariance matrix Cxx of the matrix Xtr is calculated in accordance with the Equation (5). In Equation (5), $\mu\_x$ represents the mean face coordinate vector. The mean face coordinate vector is then subtracted from matrix Xtr.

Eigenvalue decomposition is performed so as to represent the covariance matrix as in Equation (6). In Equation (6), U represents a unitary matrix having in each column a normalized eigenvector of Cxx. In Equation (6), Sxx represents a diagonal matrix having the eigenvalues of Cxx forming its diagonal.

Here, the sum of all eigenvalues is equal to the total sum of the variance observed in Cxx. Therefore, when the sum of the first K eigenvalues reaches a predetermined ratio (e.g. 99%) or higher of the sum of the all eigenvalues, the sum of the variances of the projections of the set of Mtr vectors x_m that form Xtr onto the K eigenvectors associated with the K largest eigenvalues account for more than the aforementioned ratio (i.e. 99%) of the total variance of the training data set obtained based on the training sentences. Therefore, an arbitrary vector x can be efficiently approximated as a linear combination of the first K eigenvectors of Cxx. The first K eigenvectors determine the first K principal components of matrix Xtr.

According to the data analysis carried out, 99% of the total variance present in the training data set Xtr are accounted for by the first K=7 principal components. When the matrix formed by the first seven columns (eigenvectors) of U is denoted by Ux, a given face coordinate vector x and the first K=7 principal components can be associated by Equation (7), where Px represents the principal component coefficient vector represented by Equation (8).

The principal components thus obtained are used, together with the matrix F of LSP parameters obtained in step 86, for the training of the artificial neural network (98).

Corresponding to K=7 mentioned above, the facial shape estimation unit 58 includes seven separate artificial neural networks, and the training process is performed in step 98 on all the networks. The artificial neural network used in the system of the present invention is of the feedforward type. Each network includes one non-linear hidden layer and one output linear layer, and represents the relation between LSP parameters and the face coordinate position. The seven artificial neural networks are trained to obtain seven components pk (k=1 to 7) of the above described principal component coefficient vector Px, using the LSP vector f obtained in step 84 as input. The number of layers of the artificial neural network is not limited to 2, and an artificial neural network having a structure of three or more layers may be used. Further, the network is not limited to the feedforward type, and a so called recurrent artificial neural network having a mechanism of feeding back the output of itself to its input and, hence, suitable for time sequential real time processing, may be used.

Each artificial neural network (1 to K) provides the component pk as a function of the vector f in accordance with Equation (9). In the following, to generalize the description, the number of principal components will be represented as K. Here, the hidden layer of each artificial neural network is defined by the weight matrix Wk1 and the bias vector bk1 of equation (10). The output layer is defined by the weight vector wk2 represented by Equation (12) and the bias coefficient bk2 represented by the Equation (13). The reference character Q represents the number of neurons included in the hidden layer of the artificial neural network and, in the apparatus of the present embodiment, Q=10.

Learning of the seven artificial neural networks (98) is performed in accordance with the Levenberg-Marquardt method in the present embodiment. Various optimization methods other than the Levenberg-Marquardt method may be used. For example, Newton's method, quasi Newton's method, conjugate direction method or the like may be used.

As a result of step 98, the feature parameters (weight coefficients and the like) determining the behavior of the artificial neural network are obtained for each artificial neural network (100). These feature parameters are applied to each artificial neural network of the facial shape estimation unit 74 so that each artificial neural network is adjusted, and the facial shape estimation unit 74 comes to operate in a similar manner as the facial shape estimation unit 58. More specifically, the facial shape estimation unit 74 of the face image receiving apparatus 34 comes to exhibit the same behavior as the artificial neural networks of the facial shape estimation unit 58 trained by using the training sentences in the face image transmitting apparatus 32.

In principle, by adjusting the artificial neural networks of the facial shape estimation unit 74 in this manner, when the LSP parameters of the speaker's speech are applied to the facial shape estimation unit 74 from the speech signal receiving*recovering unit 70, the corresponding estimate values~px of the principal component coefficient vector are obtained, and once the estimated value vector=px is obtained, the estimated value vector px of the coordinates of the predetermined position of the face can be obtained in accordance with Equation (7).

The system of the present embodiment described above operates in the following manner. Referring to FIG. 2, before the start of communication, first, the speaker reads a training sentence. The speech converted to audio signal by a microphone 38 is digitized by the A/D convertion unit 50, turned to vectors as LSP parameters frame by frame by is the matrix generation unit 52, and transformed into the matrix representation F. The matrix representation data of the speech signal generated by the matrix generation unit 52 are applied to the parameter training unit 56.

Parallel to the processing of the speech described above, the expression or facial shape of the speaker's face when reading the test sentence is picked up by a video camera 40 and applied to the facial motion measuring unit 64. The facial motion measuring unit 64 measures coordinates of the predetermined positions of the face by image recognition and applies the measurements to the matrix generation unit 52. Matrix generation unit 52 also turns the coordinate data into vectors frame by frame, transforms them into matrix representation X, performs PCA analysis and applies the results to the parameter training unit 56.

The parameter training unit 56 implements the training of the K=7 artificial neural networks in the facial shape estimation unit 58, using the LSP representation of the speech applied from the matrix generation unit 52 as input and the PCA component applied from the matrix generation unit 62 as a teacher signal. After training, the parameter training unit 56 transmits the feature parameters (i.e. weights) of the K=7 artificial neural networks of the facial shape estimation unit 58 to the face image receiving apparatus 34 through the transmitting unit 66 and the public network 36.

In the face image receiving apparatus 34, the facial shape estimation unit 74 sets K=7 artificial neural networks having the same configuration as the K=7 artificial neural networks included in the facial shape estimation unit 58, in the facial shape estimation unit 74 using the feature parameters received by the receiving unit 68. By this process, the facial shape estimation units 58 and 74 come to perform the same operation.

After the training of the artificial neural network in the facial shape estimation unit 58 in the face image transmitting apparatus 32 and setting up of the artificial neural networks in the facial shape estimation unit 74 in the face image receiving apparatus 34 are completed, actual communication is performed in the following manner.

The speaker speaks the contents to be transmitted to the face image receiving apparatus 34, through microphone 38. The matrix generation unit 52 operates in a similar manner as at the time of training: generates the LSP parameters obtained from the speech and applies the generated parameters to the facial shape estimation unit 58. The facial shape estimation unit 58 estimates the face coordinates of the speaker based on the input LSP parameters and outputs the face coordinate data. The output is used for error evaluation. The LSP parameters and the original digital speech signal output from the matrix generation unit 52 are transmitted through the speech signal transmitting unit 54 to the face image receiving apparatus 34.

The LSP parameters and the original digital speech signal are applied to the speech signal receiving*recovering unit 70 through the receiving unit 68. The speech signal receiving*recovering unit 70 applies the digital speech signal to the D/A converting unit 72, and the speech signal which has been converted from the digital signal to the analog signal by the D/A converting unit 72 is applied to a loudspeaker 42, whereby the original speech is recovered.

Meanwhile, the LSP parameters received by the speech signal receiving*recovering unit 70 are applied to the facial shape estimation unit 74. As the artificial neural networks in the facial shape estimation unit 74 are set as the trained artificial neural networks of the facial shape estimation unit 58, the artificial neural networks estimate and output the face coordinate data from the input LSP parameters. If the error is small enough, the face image is generated by the face image generation unit 78 based on the face coordinate data estimated in this manner and output from the facial shape estimation unit 74, and the face image of the speaker is displayed on the monitor 44. The face image of the speaker is obtained from the speech signal, and therefore motion pictures of the speaker's face can be synthesized and displayed in real time, synchronized with the recovery of the speech audio signal.

Meanwhile, the facial motion measuring unit 64 of the face image transmitting apparatus 32 measures the coordinates of the predetermined positions of the speaker's face in a similar manner as at the time of training. The error evaluation unit 60 subtracts the face coordinate data output from the facial shape estimation unit 58 from the actually measured face coordinate data of the speaker, and outputs an error signal. The absolute value of the error signal is compared with a predetermined threshold value by the error evaluation unit 60, and if the absolute value of the error signal is larger than the threshold value, the error evaluation unit 60 transmits the error signal to the face image receiving apparatus 34.

The receiving unit 68 of the face image receiving apparatus 34 applies, when the error signal is received, the error signal to the error adding unit 76. The error adding unit 76 adds the error signal to the face coordinate data output from the facial shape estimation unit 74, and applies the result to the face image generation unit 78.

By this correction, it becomes possible to prevent the error between the face coordinate data applied to the face image generation unit 78 and the face coordinate data actually measured by the face image transmitting apparatus 32 from exceeding the threshold value.

Figure 8:
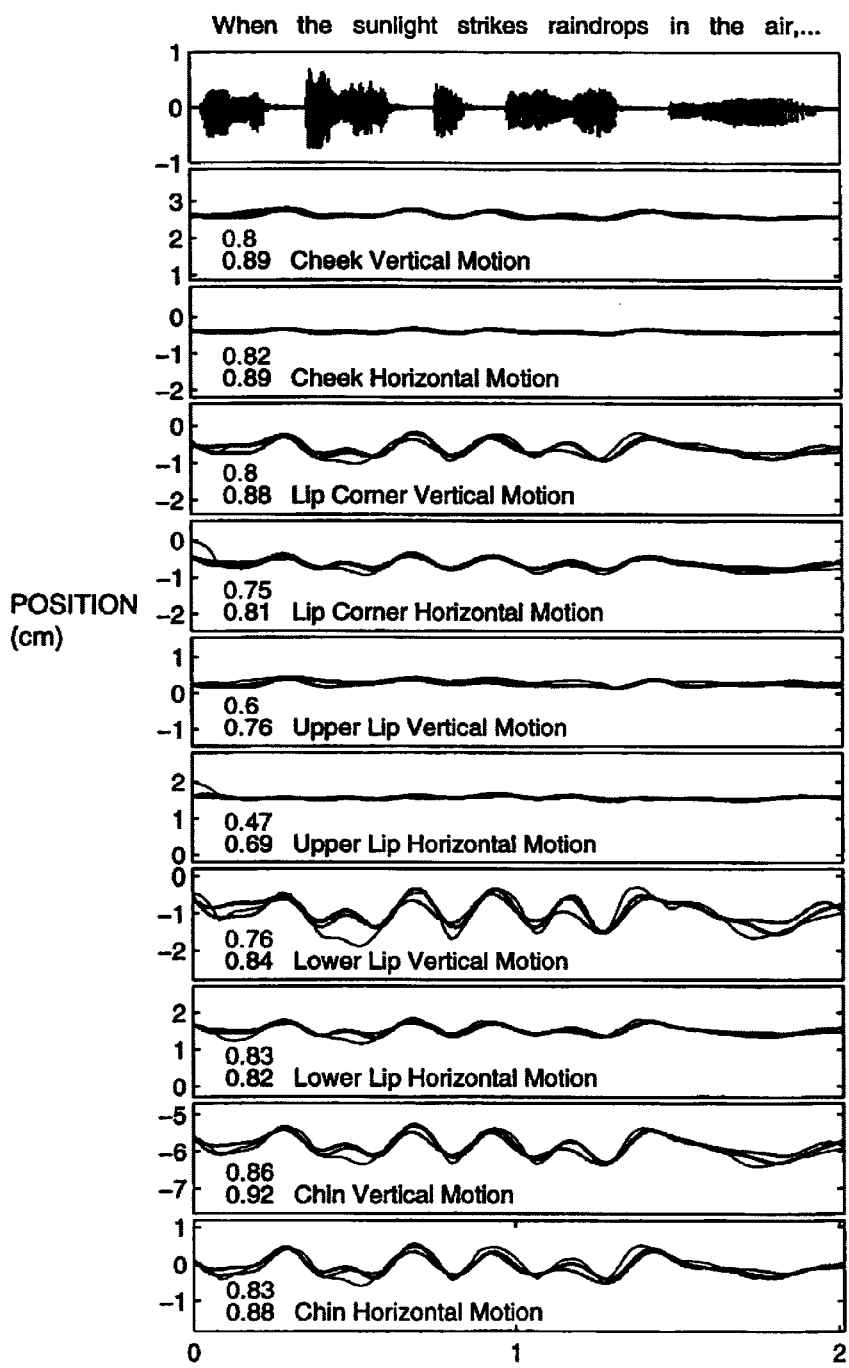
FIG. 8 shows the result obtained for an American speaker by the experimental system.

FIG. 8 represents motions of various portions of the face actually measured (dense, thin solid line) when an American speaker reads a sentence ("when the sunlight strikes raindrops in the air, . . . ") and the motion of the various portions of the speaker's face estimated by the artificial neural networks (dense, thick solid line) from the speech signal in a time-sequential manner, in the experimental system to which the present invention is applied. For comparison, results estimated by a linear estimation method such as affine transform (gray, thin solid line), not by the artificial neural networks are also shown on each graph.

Referring to FIG. 8, the uppermost graph represents the measured speech signal, and second to eleventh graphs represent results of motion in the vertical and horizontal directions of a corner of the mouth (end of the lip), upper lip, lower lip and chin, respectively. In FIG. 8, the abscissa represents time and the ordinate represents the distance of motion (cm).

Of the numbers allotted to each sections of each graph of FIG. 8, the number of the lower section represents the correlation coefficient between the face coordinate data obtained by the artificial neural networks in accordance with the present invention and the actually measured face coordinate data. The number in the upper section represents the correlation coefficient between the face coordinate data obtained by linear estimation method and the actually measured face coordinate data.

Figure 9:
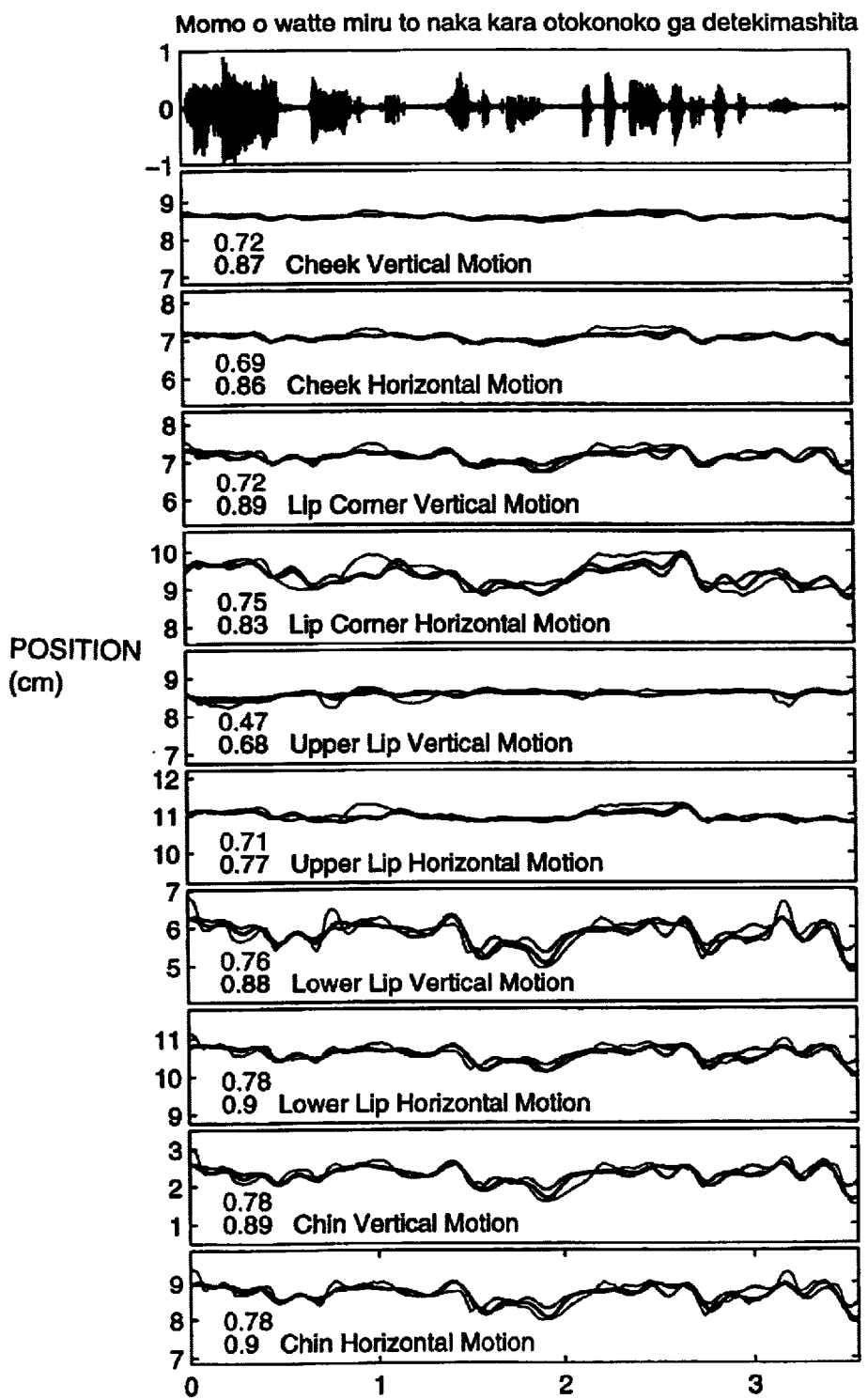
FIG. 9 shows the result obtained for a Japanese speaker by the experimental system.

FIG. 9 shows the results when a Japanese speaker reads a sentence ("momo o wattemiruto nakakara otokonoko ga detekimashita") in the experimental system to which the present invention is applied.

As can be best seen from FIGS. 8 and 9, when an artificial neural network is used, better results matching the actually measured motion of the speaker's face can be obtained. Further, if an error is found on the transmitting side, it is possible to transmit an error signal representing the error to the receiving side and to correct the output of the artificial neural network using the error signal on the receiving side. As a result, motion pictures of the same motion of the face as the actually measured facial motion of the speaker can be generated on the receiving side. Transmission of the error signal may be performed only when the error exceeds a predetermined threshold value as in the embodiment described above, as it does not hinder transmission of the speech signal. If the status of the channel allows, the error signal may be constantly transmitted and the correction may be constantly done by the receiving side.

As described above, in the system in accordance with the present embodiment, the artificial neural network learns before communication, and the feature parameters of the artificial neural network are transmitted to the receiving side, and thereafter, simply by the transmission of almost only the speech signal, it is possible for the receiving side to synthesize and display real time motion pictures of the speaker's face. As the amount of data of the initial feature parameters is not much, real time transmission of the motion pictures of the face is possible in a satisfactory manner, even if the channel has very limited transmission capacity, such as in the case of a telephone line. When the error signal is additionally transmitted, the deviation from the synthesized motion pictures of the face and speech can be minimized. Transmission of the error signal, however, is not necessary, and the initial transmission of parameters and the transmission of the speech signal thereafter ensure communication of sufficient quality.

Though it is necessary that the artificial neural networks in the facial shape estimation unit 58 is adjusted before each communication in the description above, learning of the facial shape estimation unit 58 every time is unnecessary if the speaker is a specific person, and the settings of the last communication can be used as they are. Further, if the face image receiving apparatus 34 communicates only with a specific speaker of the specific face image transmitting apparatus 32, the settings of the last time are available as the settings of the facial shape estimation unit 74, and therefore it is unnecessary to transmit the feature parameters of the artificial neural network of the facial shape estimation unit 74 from the face image transmitting apparatus 32 to the face image receiving apparatus 34.

It is needless to say that the face image transmitting apparatus and the face image recovering apparatus can be implemented by a general purpose computer, a program executed thereon and general peripheral devices such as a microphone, a loudspeaker, a monitor, a modem and/or a terminal adapter.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of transmitting a face image, comprising the following steps:

preparing facial shape estimation means receiving speech produced by a speaker and outputting a signal estimating the facial shape of the speaker during speech production;

receiving the speech produced by the speaker from the transmitting side to a receiving side, applying the received speech to the facial shape estimation means and obtaining a signal estimating facial shape of the speaker based on a neural network technique; and generating a motion picture of the facial shape of the speaker based on the signal estimating the facial shape of the speaker output from the facial shape estimation means;

wherein the step of preparing includes the steps of preparing artificial neural networks identical to each other in the transmitting side and the receiving side, performing a training process on the artificial neural networks of the transmitting side such that information specifying a face image of the speaker is output upon reception of the speech produced by the speaker, and transmitting feature parameters of the trained artificial neural network of the transmitting side to the receiving side, and setting the artificial neural networks of the receiving side with the transmitted feature parameters.

2. The method of transmitting face image according to claim 1, wherein the step of training includes the steps of:

time sequentially measuring coordinates of predetermined portions of the face of the speaker reading sentences for training, time sequentially finding speech features of the speech produced by the speaker when she/he reads the sentences for training, and adjusting feature parameters of the transmitting side using the speech feature as input and the measured coordinates as a teacher signal.

3. The method of transmitting face image according to claim 2, further comprising the steps of:

after the artificial neural network trained on the transmitting side, time sequentially measuring coordinates of predetermined portions of the speaker's face when the speaker speaks;

applying the speech produced by the speaker to the trained artificial neural network of the transmitting side and obtaining as output of the trained artificial neural network, estimated values of the coordinates of the predetermined portions of the speaker's face; and comparing the measured coordinates with the estimated values of the coordinates to find the error of the estimated values of the coordinates.

4. The method of transmitting face image according to claim 3, further comprising the steps of:

receiving the error on the receiving side and correcting, based on the received error, the output of the artificial neural network of the receiving side.

5. The method of transmitting face image according to claim 3, further comprising the steps of:

comparing the magnitude of the error with a predetermined threshold value;

transmitting the error to the receiving side in response to the magnitude of the error exceeding the predetermined threshold value; and receiving the error at the receiving side and correcting, based on the received error, the output of the artificial neural network at the receiving side.

6. A face image transmitting system for transmitting a motion picture of a face when a speaker on a transmitting side speaks to a receiving side, comprising:

a transmitting apparatus transmitting a speech signal produced by the speaker to the receiving side, wherein the transmitting apparatus includes a feature extracting means for time sequentially extracting predetermined features of the speech produced by the speaker, an artificial neural network capable of learning such that, using feature parameters output from the feature extraction means based on the speech produced by the speaker, information specifying a face image of the speaker is output, and a means for transmitting the feature parameters of the artificial neural network to the receiving side; and a receiving apparatus, wherein the receiving apparatus includes a neural network based facial shape estimation means receiving the speech signal spoken by the speaker transmitted from the transmitting apparatus and outputting a signal estimating the facial shape of the speaker when he/she speaks the speech, and face image generation means generating the motion picture of the facial shape of the speaker based on the signal estimation the facial shape of the speaker output by the facial shape estimation means upon reception of the speech signal produced by the speaker from the transmitting side;

wherein said facial shape estimation means includes an artificial neural network identical in configuration to the artificial neural network of the transmitting apparatus, and means for setting the artificial neural network of the receiving apparatus with the feature parameters transmitted from the transmitting apparatus.

7. The face image transmitting system according to claim 6, wherein the transmitting apparatus further includes measuring means for time sequentially measuring, when the speaker speaks, coordinates of predetermined portions of the face of the speaker, and training means for implementing training of the artificial neural network of the transmitting apparatus using the coordinate data obtained by the measuring means for the predetermined portions of the speaker's face when the speaker reads training sentences as a teacher signal and features of the speech obtained by the feature extracting means as input.

8. The face image transmitting system according to claim 7, wherein the transmitting apparatus further includes means for comparing, after the artificial neural network of the transmitting side is trained, estimated values of the coordinates of the predetermined portions of the speaker's face obtained by applying the speech produced by the speaker to the trained artificial neural network of the transmitting side with the measured coordinates, and for finding the error of the estimation values of the coordinates.

9. The face image transmitting system according to claim 8, wherein the transmitting apparatus further includes means for transmitting the error to the receiving side, and the receiving apparatus further includes error correcting means receiving the error and correcting, based on the received error, an output of the artificial neural network of the receiving side.

10. The face image transmitting system according to claim 8, wherein the transmitting apparatus further includes means for comparing the magnitude of the error with a predetermined threshold value and transmitting the error to the receiving side in response to the magnitude of the error exceeding the predetermined threshold value; and the receiving apparatus further includes error correcting means for correcting, based on the received error, an output of the artificial neural network of the receiving side.

11. A face image transmitting apparatus used in a face image transmitting system transmitting motion picture of a face when a speaker speaks on a transmitting side to a receiving side, comprising:

means for transmitting speech produced by the speaker to the receiving side;

an artificial neural network capable of learning such that information specifying the face image of the speaker is output, using features of the speech produced by the speaker as input; and means for transmitting the feature parameters of the artificial neural network to the receiving side;

measuring means for time sequentially measuring coordinates of predetermined portions of the speaker's face;

feature extracting means for time sequentially extracting predetermined features of the speech spoken by the speaker; and means for implementing training of the artificial neural network using the features obtained by the feature extracting means when the speaker reads training sentences as input and the coordinates measured by the measuring means when the training sentences are read as a teacher signal.

12. The face image apparatus according to claim 11, further comprising means for comparing, after the artificial neural network is trained, estimated values of the coordinates of the predetermined portions of the speaker's face obtained by applying the feature output by the feature extracting means for the speech spoken by the speaker to the learned artificial neural network with the coordinates measured by the measuring means, for finding the error of the estimated values of the coordinates.

13. The face image transmitting apparatus according to claim 12, wherein
the transmitting apparatus further includes means for transmitting the error to the receiving side.

14. The face image transmitting apparatus according to claim 12, wherein
the transmitting apparatus further includes means for comparing the error with a predetermined threshold value and for transmitting the error to the receiving side in response to the error exceeding the predetermined threshold value.

15. A face image recovering apparatus, comprising:
a neural network based facial shape estimation means receiving predetermined features obtained from the speech produced by the speaker, for estimating facial shape of the speaker when he/she produces speech; and
face image generation means for generating a motion picture of the face image of the speaker based on the signal estimating the facial shape of the sneaker output by the facial shape estimation means upon reception of the features, wherein the facial shape estimation means includes
an artificial neural network of a predetermined configuration, and
means, receiving feature parameters for setting the artificial neural network before recovery of a face image from a predetermined signal source, for setting the artificial neural network with the feature parameters.

16. The face image recovering apparatus according to claim 15, further comprising
error correcting means, receiving the error transmitted from the predetermined signal source after the artificial neural network of the face image receiving apparatus is set, for correcting the output of the artificial neural network of the face image recovering apparatus based on the received error.

17. A face image transmitting system for transmitting a face of a speaker on the transmitting side when he/she speaks to the receiving side, comprising:
a transmitting apparatus transmitting the speech signal spoken by the speaker to the receiving side, wherein the transmitting apparatus includes
a facial shape estimation circuit estimating the facial shape of the speaker by time sequentially extracting predetermined feature parameters of the speech produced by the speaker,
an artificial neural network capable of learning such that information specifying the face image of the speaker is output, using the feature parameters output from the facial shape estimation circuit as input, and
a transmitting circuit transmitting the feature parameters of the artificial neural network to the receiving side; and
a receiving apparatus that includes
a neural network based facial shape estimation circuit receiving the speech signal spoken by the speaker transmitted from the transmitting apparatus and outputting a signal associating the speech with an estimated facial shape of the speaker when he/she speaks, wherein the facial shape estimation circuit includes an artificial neural network identical in configuration to the artificial neural network of the transmitting apparatus and set by the feature parameters transmitted from the transmitting apparatus, and
a face image generation circuit generating a motion picture of the facial shape of the speaker based on the signal output by the facial shape estimation circuit upon reception of the speech signal produced by the speaker from the transmitting side.

18. The face image transmitting system according to claim 17, wherein
the transmitting apparatus further includes
a measurement circuit measuring coordinates of predetermined portions of the speaker's face in a time sequence when the speaker speaks, and
a parameter training unit implementing training of the artificial neural network of the transmitting apparatus using coordinate data obtained by the measuring circuit for the predetermined portions of the speaker's face when the speaker reads training sentences as a teacher signal, and using features of the speech obtained by the facial shape estimate circuit of the transmitting apparatus as input.

19. A face image transmitting apparatus used in a face image transmitting system for transmitting motion picture of the face of a speaker on a transmitting side when he/she speaks to a receiving side, comprising:
a speech signal transmission circuit transmitting the speaker's speech to a receiving apparatus;
an artificial neural network capable of learning such that information specifying the face image of the speaker is output, using features of the speech produced by the speaker as input;
a parameter transmitting circuit transmitting feature parameters of the artificial neural network to the receiving side;
a measurement circuit measuring coordinates of predetermined portions of the speaker's face in a time sequence;
a speech parameter matrix generation circuit time sequentially extracting predetermined feature parameters of the speech spoken by the speaker and generating a speech parameter matrix; and
a parameter training circuit implementing training of the artificial neural network, using the speech parameter matrix generated by the speech parameter matrix generation circuit when the speaker reads training sentences as input, and using the coordinates measured by the measuring circuit when the training sentences are read as a teacher signal.

20. A face image recovering apparatus, comprising:
a neural network based facial shape estimation circuit receiving predetermined features obtained from the speech produced by the speaker, and outputting a signal estimating the facial shape of the speaker when the speaker produces speech, wherein the facial shape estimation circuit includes
an artificial neural network of predetermined configuration, and
a circuit receiving feature parameters for setting the artificial neural network from a predetermined signal source before recovering a face image, and setting the artificial neural network by the feature parameters; and
a face image generation circuit for generating a motion picture of the facial shape of the speaker based on the signal estimating the facial shape of the speaker output by the facial shape estimation circuit upon reception of the feature.

21. A method of generating a face image, comprising the following steps:

preparing a facial shape estimation means receiving speech produced by a speaker, and outputting a signal estimating the facial shape of the speaker during speech production;

receiving the speech produced by the speaker, applying the received speech to the facial shape estimation means and obtaining a signal estimating facial shape of the speaker based on a neural network technique; and generating a motion picture of the facial shape of the speaker based on the signal estimating the facial shape of the speaker output from the facial shape estimation means;

wherein the step of preparing includes the steps of preparing artificial neural networks identical to each other in the transmitting side and the receiving side, performing a training process on the artificial neural networks such that information specifying a face image of the speaker is output upon reception of the speech produced by the speaker, and receiving feature parameters of the trained artificial neural network and setting the artificial neural networks of the receiving side with the transmitted feature parameters.

22. The method of generating face image according to claim 21, wherein the step of training includes the steps of time sequentially measuring coordinates of predetermined portions of the face of the speaker reading sentences for training, time sequentially finding speech features of the speech produced by the speaker when she/he reads the sentences for training, and adjusting feature parameters of the transmitting side using the speech feature as input and the measured coordinates as a teacher signal.

23. The method of generating face image according to claim 22, further comprising the steps of after the artificial neural network trained time sequentially measuring coordinates of predetermined portions of the speaker's face when the speaker speaks;

applying the speech produced by the speaker to the trained artificial neural network and obtaining as output of the trained artificial neural network, estimated values of the coordinates of the predetermined portions of the speaker's face; and comparing the measured coordinates with the estimated values of the coordinates to find the error of the estimated values of the coordinates.

24. The method of generating face image according to claim 23, further comprising the steps of:

receiving the error on the receiving side and correcting, based on the received error, the output of the artificial neural network.

25. The method of generating face image according to claim 23, further comprising the steps of:

comparing the magnitude of the error with a predetermined threshold value;

in response to the magnitude of the error exceeding the predetermined threshold value, receiving the error and correcting, based on the received error, the output of the artificial neural network at the receiving side.

* * * * *